A. B. LAMB AND A. T. LARSON.
METHOD AND APPARATUS FOR TESTING GASES.
APPLICATION FILED FEB. 17, 1919.

1,321,064.

Patented Nov. 4, 1919.
2 SHEETS—SHEET 1.

UNITED STATES PATENT OFFICE.

ARTHUR B. LAMB AND ALFRED T. LARSON, OF THE UNITED STATES ARMY.

METHOD AND APPARATUS FOR TESTING GASES.

1,321,064.  Specification of Letters Patent.  Patented Nov. 4, 1919.

Application filed February 17, 1919. Serial No. 277,600.

*To all whom it may concern:*

Be it known that we, ARTHUR B. LAMB, Lt. Col., and ALFRED T. LARSON, captain, Chemical Warfare Service, U. S. Army, citizens of the United States, residing in Washington, D. C., whose post-office address is Cosmos Club, Washington, D. C., have invented certain new and useful Improvements in Methods and Apparatus for Testing Gases, of which the following is a specification.

This invention relates to a method of and apparatus for testing gases, and more specifically a mixture of gases such as flue-gas which contains carbon monoxid. In determining the concentration of carbon monoxid in gas a rapid method is desirable which will give quantitative results that are accurate and reliable. It is also desirable in making these quantitative determinations of the carbon monoxid in gas that the analyst should be able to make satisfactory tests, even when located at a distance from the source of supply of the gas containing the carbon monoxid.

One of the objects of this invention is to provide a method and means for making accurate and rapid quantitative determinations of carbon monoxid or other combustible gas in a mixture of gases, the method and apparatus being capable of application at a place which may be remote from where the analyst is located.

Another object of this invention is to provide a method and means for the quantitative determinations of combustible matter in gases, wherein a platinum resistance thermometer, preferably of the differential type, is employed, and wherein the same electric current heats the two wires in series of the thermometer. This provision helps to insure independence from the unavoidable fluctuations in the source of electric energy.

Another object of this invention is to provide a method and means for bringing gases to be tested at a uniform temperature and free from eddies in contact with the wires of the platinum resistance thermometer.

Another object of this invention is to provide a method and means for passing gas containing combustible material and free from eddies over one of a pair of heated resistance wires, then destroying any combustible material which remains in the gas, and then passing the residual gas over the other resistance wire in substantially identical or precisely similar manner and environment and measuring difference in the resistance between the two resistance wires.

Reference is to be had to the accompanying drawings in which:

Fig. 3 is a detailed view of the tube in which the electric conduit for holding the resistance wires is placed.

Fig. 4 is a specific detail view of the electric resistance wires and the connections thereto.

Figure 2:
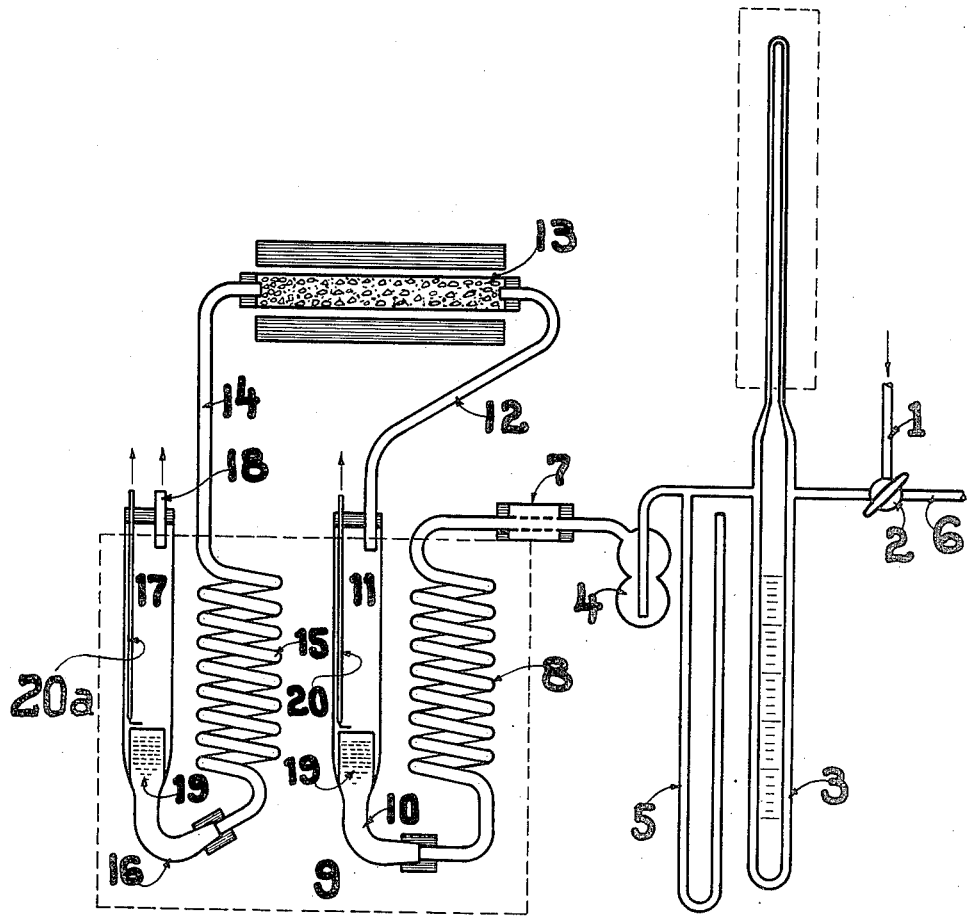
Fig. 2 shows the arrangement of the gas conduit, temperature control of the gases, the combustion chamber and the relative position of the resistance wires.

Air is supplied from the inlet pipe (1), and passes through a three-way valve (2), through a flow-meter (3), and then through a bottle (4), containing $H_2SO_4$. A manometer (5) is placed between the flow-meter (3) and bottle (4), and serves to indicate the pressure of air or other gas in the line. The gas containing carbon monoxid or other combustible material is admitted through the pipe (6), passes through the three-way valve (2) and then flows through the flow-meter (3) to the bottle (4) in the same way as the air does. The air or gas is relieved of moisture by the $H_2SO_4$ in the bottle (4), passes through the glass wool plug (7), which serves to remove acid spray, then passes through a long coil (8), which is kept in the thermostat (9) (indicated in dotted lines in Fig. 2), and then passes through a small tube (10), into a larger tube (11), then through the passage (12), to the combustion chamber (13).

It should be understood that it is not absolutely necessary for the air or gas to be relieved of moisture before passing into the coil (8) and it has been found that satisfactory results could be obtained by dispensing with the bottle (4) and spray catcher (7).

Gases leaving the combustion chamber are conducted through passage (14), through another long spiral (15), which is also kept in the thermostat (9). The gases then pass through the small tube (16), and then through the tube (17), to the waste pipe (18). The air or gas is drawn through the system by suction.

Inside of the small tubes (10) and (16), there are placed a number of layers of coarse cotton gauze or other porous or fibrous material (19) and any eddies which may be present in gases entering the tubes (10) and (16), are practically destroyed by the gauze or porous material, and gases leaving the tubes (10) and (16) are substantially free of such eddies.

The tubes (10) and (16) project into the tubes (11) and (17), respectively, and reach almost to the thin tubes (20) and (20ª) which extend into said tubes (11) and (17) from the opposite end of said last named tubes. By reference to Fig. 3 it may be seen that the portion (10ª) of the tube (10) which projects into the tube (11) is of greater section than the part outside of the latter tube. This forms a shoulder (10ᵇ) for supporting the porous or fibrous material (19).

The thin tubes (20) and (20ª) are conduits for electric conductors. These conduits terminate in a split portion consisting of two passages (21) and (22) (see Fig. 4). The extremities of the passages (21) and (22) are sealed, and stout platinum wires (23) and (24) are also sealed into these extremities and project a short distance into the passages (21) and (22), respectively. The wires (23) and (24) are bent to form a right angle and extend about one-half inch from the bend. A slit is cut in the end of each wire and a thin strand of platinum wire (25) is inserted in each slit and thereby makes electrical contact between the wires (23) and (24).

The electric conductors in the tubes (20) and (20ª) usually consist of a pair of insulated copper wires (26) and (27) (shown in Fig. 4) and reach almost to the bottom of the passages (21) and (22) in the forked portion of tube (20). Mercury is placed in the bottom of the passages (21) and (22) and an electric contact is afforded thereby between the wires (23) and (26) and the wires (24) and (27).

The combustion chamber (13) is an electric tube furnace in which is placed a seamless tube, which may be of steel, and have a diameter of about one inch and length of about three feet. A layer of CuO, or other suitable oxidizer, about eight inches long, is placed near the middle of this tube. The furnace is operated at a dull red heat. The function of this furnace is to burn all of the combustible matter in the gases which are not burned in passing the wire (25). The gases leaving this furnace are therefore free of combustible material and when these gases are brought in contact with the heated resistance wire (28) in tube (17), there will be no increase in the temperature of the wire because of such gases.

Figure 1:
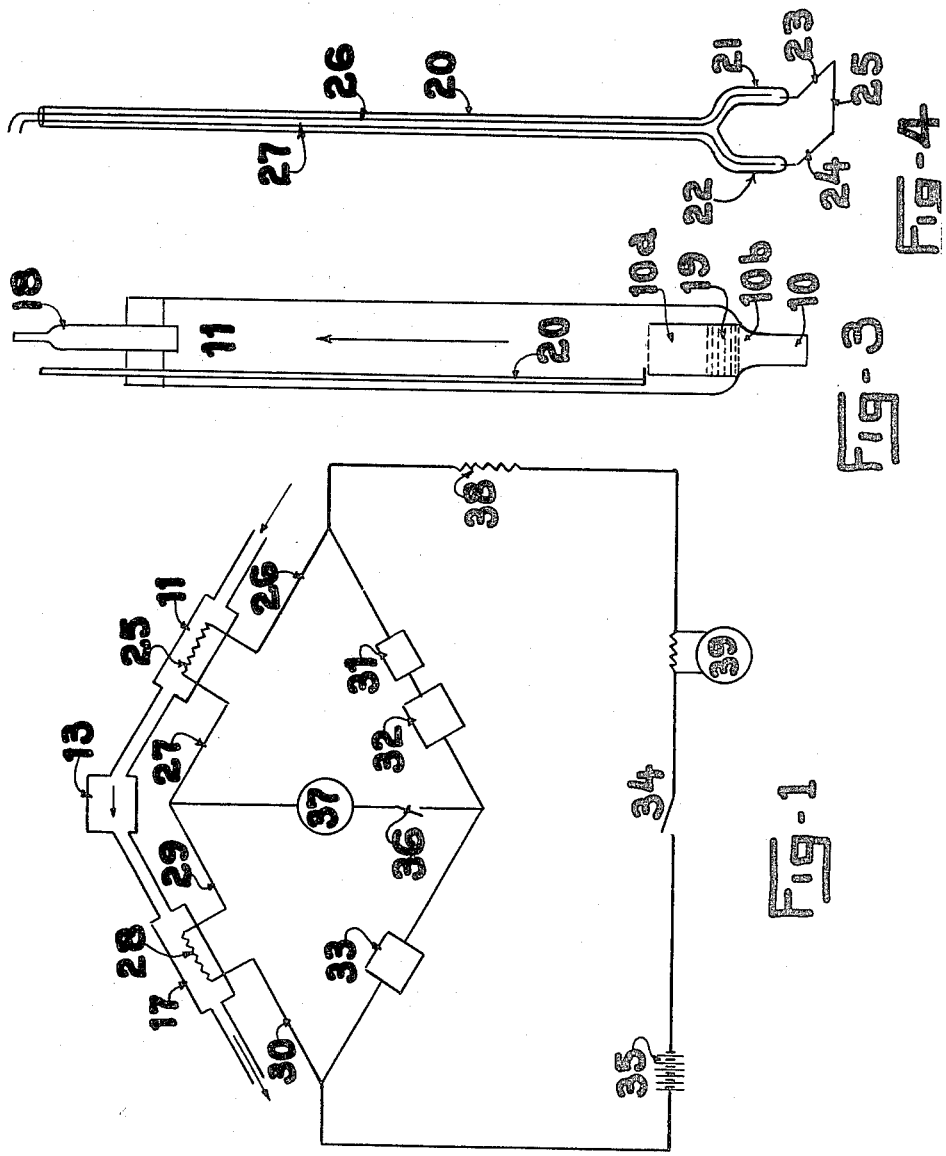
Figure 1 is a diagrammatic representation of the apparatus.

The means of measuring the change in resistance of the wire (25), produced by the burning of combustible material in contact therewith, is shown in Fig. 1. It consists of a Wheatstone bridge, one side of which is the resistance wire (25) and the conductors (26) and (27). Another side consists of the resistance wire (28) and the conductors (29) and (30). The resistance wire (28) and conductors (29) and (30) occupy the corresponding position in tube (17) as do the resistance wire (25) and conductors (26) and (27) in tube (11) and are constructed in a similar way. The two remaining sides are formed by the resistances (31), (32) and (33).

By closing the switch (34), current from the battery (35) is passed through the bridge, bringing wires (25) and (28) to about a dull red heat. Air is passed over wire (25), then through the combustion tube (13) and finally over wire (28). By means of the thermostat (9), air is made to strike the wires (25) and (28) at practically the same temperature. Then the rate of flow of air is adjusted, the switch (36) closed and the bridge balanced by means of the variable resistances (31), (32) and (33). By means of the slide wire resistance (38) and the milli-voltmeter (39), the current flowing through the bridge is kept constant.

The gas mixture to be tested is now introduced at (6). Combustion takes place at (25) with consequent increase in the temperature of (25). The temperature rise measured by the change in resistance of (25) has been found to be proportional to the concentration of the CO or other combustible gas present. This relationship between the rise in temperature and concentration of combustible gas holds good for mixtures having low percentages of combustible matter. The combustion of the unburned gas is completed in the furnace (13) and the gas is then led over the wire (28). Since no combustion takes place on (28), its resistance remains constant. The deflection produced in the galvanometer (37) is therefore proportional to the change in the resistance of the wire (25), which in turn is proportional to the concentration of the CO or other combustible material. The scale readings on the galvonometer (37) may be calibrated to give directly the percentage of an unknown combustible gas in a given mixture.

The present invention is not limited to the specific details set forth in the foregoing examples which should be construed as illustrative and not by way of limitation, and in view of the numerous modifications which may be effected therein without departing from the spirit and scope of this invention, it is desired that only such limitations be imposed as indicated in the appended claims.

We claim—

1. A method of quantitative determination of gases comprising changing the resistance of one of a pair of electrically heated wires by passing gas containing combustible material and free of eddies over said wire and measuring the change in resistance.

2. A process of testing gases by a differential method, comprising bringing said gases in contact with a wire which has been heated, then conducting the residual gas through a combustion chamber and then over a second heated wire.

3. A process of testing gases by a differential method comprising passing an electric current in series through a pair of resistance wires placed in a gas conduit, bringing gas into said conduit and destroying substantially all eddies in said gas, then passing said gases in contact with one of said resistance wires, then through a combustion chamber and then in contact with the second resistance wire.

4. A process of testing gases by a differential method comprising heating a pair of resistance wires to substantially the same temperature by means of an electric current, passing gas which is substantially free of eddies in contact with one of said heated wires, then through a combustion chamber and then in contact with the other heated wire.

5. A process of testing gases by a differential method comprising heating a pair of resistance wires to substantially the same temperature by means of an electric current, passing gas which is substantially free of eddies in contact with one of said heated wires, then through a combustion chamber, then through porous material and then in contact with the other of said wires.

6. A method of quantitative determination of gases comprising measuring the difference in resistance produced between two heated wires having substantially the same form, and also substantially the same resistance at the same temperature, by passing gas substantially free of eddies and containing combustible material over one of said wires, and the residual gas substantially free of combustible material over the other wire.

7. A method of quantitative determination of gases, comprising measuring the difference in resistance produced between two wires heated to redness and having substantially the same form, and also substantially the same resistance at the same temperature, by passing gas containing combustible material and free of eddies over one of said wires, and the residual gases substantially free of combustible material and eddies over the other wire.

8. In an apparatus for testing gases, means comprising two wires arranged in series and heated by the same electric current, means for bringing the gases in contact with one of said wires and means for indicating changes in resistance of said wire caused by said gases.

9. In an apparatus for testing gases means comprising two wires for calorimetric determination of gases by a differential method, said wires being arranged in series and heated by the same electric current.

10. An apparatus for testing gases comprising two wires electrically connected, means for bringing gases substantially free from eddy currents in contact with said wires and a source of electric power for heating said wires.

11. An apparatus for testing gases comprising two wires, means for bringing the gases in contact with one of said wires and means for bringing the residual portion of said gases after being substantially freed of combustible matter in contact with the other of said wires.

12. An apparatus for testing gases comprising two wires, means for bringing the gases in contact with one of said wires, means for bringing the residual portion of said gases after being substantially freed of combustible matter in contact with the other of said wires, and means for destroying eddy currents in the gases before coming in contact with said wires.

13. An apparatus for testing gases comprising two electrically connected wires of substantially the same form and resistance, a container for each of said wires, a combustion chamber and gas passages joining said combustion chamber to each of said containers.

14. An apparatus for testing gases comprising a thermostat, a gas conduit having two portions extending into said thermostat, a resistance wire in each portion of gas conduit extending into the thermostat, said wires being electrically connected, and a combustion chamber in said gas conduit between the portions extending into said thermostat.

15. An apparatus for testing gases comprising two wires, means for heating said wires, means for bringing gases substantially free from eddy currents in contact with said wires, and means for delivering the gases at substantially the same temperature in the vicinity of each of said wires.

16. An apparatus for testing gases comprising two wires having electrical connection with each other, means for indicating the difference in the differences of potential between the terminals of said wires, a gas conduit and means for destroying eddies in the gases before coming in contact with said wires.

17. An apparatus for testing gases comprising two wires having electrical connection with each other, a source of electric energy for heating said wires, means for bringing gases substantially free from eddies in contact with said wires, and means for indicating the difference in the differences of potential between the terminals of said wires.

18. An apparatus for testing gases comprising two wires of substantially the same form and resistance, said wires being electrically connected, a source of electric energy for heating said wires, means for bringing gases substantially free from eddies in contact with said wires and means for indicating the difference in the differences of potential between the terminals of said wires.

19. An apparatus for testing gases comprising two wires electrically connected, a container with porous material for destroying eddies in gases before coming in contact with said wires and a gas conduit in which said wires and container are placed.

20. An apparatus for testing gases comprising two wires of substantially the same form and resistance, said wires being electrically connected, containers with porous material for destroying eddies in gases before coming in contact with said wires, a gas conduit in which said wires and containers are placed, a source of electric energy for heating said wires and means for indicating the difference in the differences of potential between the terminals of said wires.

21. An apparatus for testing gases comprising a thermostat, a gas conduit having two portions extending into said thermostat, a wire of substantially the same form and resistance in each of said portions of gas conduit, a container with porous material placed in said gas conduit near each of said wires and in the path of the gases before reaching said wires, a source of electric energy for heating said wires and means for indicating the difference in the differences of potential between the terminals of said wires.

22. An apparatus for testing gases comprising a thermostat, a gas conduit having two portions extending into said thermostat, a wire of substantially the same form and resistance in each of said portions of gas conduit, a container with porous material placed in said gas conduit near each of said wires and in the path of the gases before reaching said wires, a source of electric energy for heating said wires, means for indicating the difference in the differences of potential between the terminals of said wires, and a combustion chamber in said gas conduit between the portions extending into said thermostat.

23. An apparatus for testing gases comprising a thermostat, a gas conduit having two portions extending into said thermostat, a wire of substantially the same form and resistance in each portion of gas conduit extending into the thermostat, said wires being electrically connected, means for indicating the difference in the differences of potential between the terminals of said wires and a combustion chamber in said conduit between the portions extending into said thermostat.

24. An apparatus for testing gases comprising a thermostat, a gas conduit having two portions extending into said thermostat, a wire of substantially the same form and resistance in each portion of gas conduit extending into the thermostat, said wires being electrically connected, means for indicating the difference in the differences of potential between the terminals of said wires, a combustion chamber in said conduit between the portions extending into said thermostat and means for destroying eddies in the gases before coming in contact with said wires.

ARTHUR B. LAMB.
ALFRED T. LARSON.